March 19, 1935.                L. DE FLOREZ                1,994,885
                              COMPASS MOUNTING
                             Filed Sept. 1, 1933
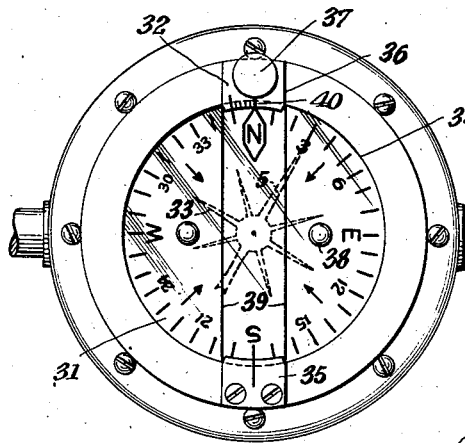
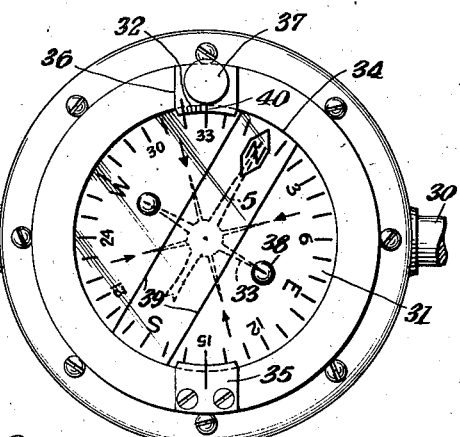
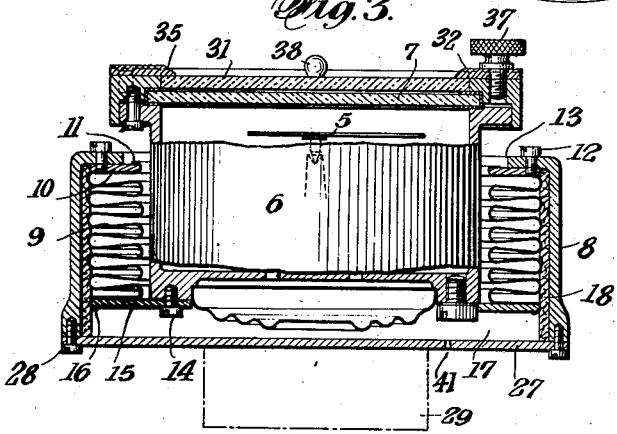
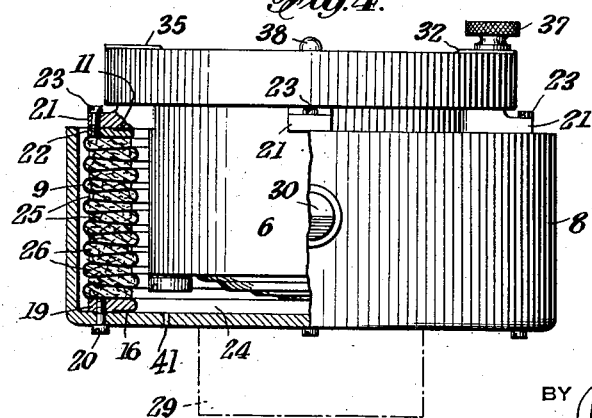
LUIS DE FLOREZ
   INVENTOR
BY 
     ATTORNEY Patented Mar. 19, 1935

1,994,885

UNITED STATES PATENT OFFICE 1,994,885

COMPASS MOUNTING

Luis de Florez, New York, N. Y.

Application September 1, 1933, Serial No. 687,738

11 Claims. (Cl. 248—30)

The general purpose of this invention is to provide a mounting for precision instruments and delicate mechanisms which will protect them from vibration causing deterioration and errors in reading and which at the same time will hold them in position with sufficient firmness to insure accurate operation.

Instruments mounted in aircraft, fast motor boats and the like are subject to sharp and varying vibratory motions in addition to varying forces exerted by the motion of the craft itself.

Various attempts have been made to overcome the undesirable and harmful effects produced by these disturbing forces, involving usually the mounting of such instruments on felt, rubber or other soft and elastic materials. Such mountings however are only moderately effective involving as they do a certain degree of looseness permitting undesirable freedom of movement resulting in inaccuracies in reading and also because at certain speeds the periods of vibration are such as to cause certain delicate instruments, such as a compass to "hunt" or swing through a wide arc and under some severe conditions actually to completely revolve.

It has been found as a result of considerable research that such vibrations can be overcome effectively by certain damping mechanism permitting of limited vertical, lateral and rocking movements.

For purposes of disclosure, the invention is shown as applied to a compass, which thus protected against vibration and consequent pivot jarring is made extremely sensitive, quick and smooth in action. In such connection the invention is a material aid to navigation, particularly in aircraft where "swinging" of the compass card or needle is a serious difficulty and where effectiveness of the compass is largely dependent on low pivot friction.

In the drawing, forming part of the specification, there are illustrated different embodiments of the invention and it is to be understood that the structure may be further varied, all within the true intent and broad scope of the invention hereinafter defined.

Figures 1 and 2 are plan views of one embodiment of the invention the mounting trunnions being shown as broken away.

Figure 3 is a broken and vertical cross sectional view of the structure.

Figure 4 is a generally similar broken and vertical sectional view illustrating another embodiment of the invention.

The compass illustrated is of the aperiodic type involving a sensitive, lightly balanced magnetic needle 5 mounted in a case 6 closed by transparent cover 7 and cooperating with a special compass dial later described.

Surrounding the case of the instrument is a cup shaped housing 8 and connecting the two is a flexible resilient metallic bellows 9, frequently termed a "sylphon".

In the first form of the invention shown, the sylphon supports the compass in tension; whereas in the second form shown, the bellows supports the compass instrument in compression.

Accordingly in Figure 3 the bellows is shown suspended in the casing by a mounting ring 10 secured to the upper flanged end 11 of the bellows and held by the screws 12 to the under side of the inturned flange 13 at the upper end of the casing. The case of the instrument is shown secured by screws 14 in supported relation on a ring 15, secured to the lower flanged end 16 of the bellows.

By the construction described the bellows is sealed in the mounting cup so that fluid within the space 17 confined between the two may serve as a damping agent to control vibrations and oscillations of the sylphon and supported instrument. This damping fluid may simply be the confined air or other medium may be provided.

In addition to or in place of the fluid damping medium, mechanical damping medium may be provided, such as a layer or layers 18 of felt or like resilient material, confined in the casing about the sylphon and in contact with the outer folds of the same.

Instead of the suspension mounting described, the compression support illustrated in Figure 4 may be used, the main distinction in this illustration being that in such case the ring 19 attached to the lower end of the bellows may rest on the bottom of the cup shaped housing, secured as by screws 20, and that the compass may have a flange or lugs 21 seated on the upper bellows ring 22, secured by screws 23. If the mounting lugs 21 be extended as a continuous flange, there will then be a damping chamber 24 completely enclosed between the compass case and housing cup, of substantially the same effect as the damping chamber 17 in the first form described. With separated lugs, however, as disclosed, the pumping action from movement of the sylphon will be less effective for damping purposes. The amount and extent of relief openings, such as those shown between the mounting lugs, may be governed to regulate the displacement action and hence the desired amount of fluid damping.

Where there is less or practically no fluid damping, as may be the case as shown in Figure 4, mechanical damping may be employed after the manner shown in Figure 3, or as indicated in the Figure 4 construction, by placing washer-like layers 25, 26 between either or both the outer folds and the inner folds of the bellows structure.

The housing shown in Figure 4 is of true cup formation, with a solid or integral back; whereas, in the first design shown, the housing has a removable back wall 27 secured by screws 28, both forms having special advantages.

The broken lines at 29 in Figures 3 and 4 show how a compensator for the compass may be conveniently mounted on the back wall of the housing. Also, in the several views, trunnions are indicated at 30, directly attached to the housing by which the unit structure may be tiltably mounted for leveling purposes.

It will be apparent that the invention provides a universal cushion mounting for a compass or like sensitive instrument, which allows relatively free movement vertically, horizontally and laterally and without permitting twisting on the vertical axis of the ship. The compass, in the case of aircraft use, is thus cushioned against vibrations and held fixed on the line of flight or axis of the ship while free to rock or oscillate as required to absorb vibrations or accommodate itself to movements of the ship. Natural periods of vibration may be predetermined and controlled by resiliency, size and number of folds of the sylphon and weight of the superimposed load and suitable damping may be employed by utilizing the displacement action of the sylphon and damping medium, such as felt or like, disclosed. The cushioning effect is determined by the resiliency of the bellows and the damping control exercised thereon. One or more small openings 41 may be provided in the back of the case for relief of air and release of condensed moisture. The damping effect may be relatively slight, permitting, particularly if a long bellows is employed, an actual lateral shifting of the supported instrument. This may permit the compass to shift laterally to one side of the axial line of the craft, but in such event it will still remain parallel with the true axis and therefore accurate for navigation of the ship. This motion is very valuable to absorb certain undesirable components of vibration.

The bellows is a simple mechanical structure and while desirably resilient, is relatively rugged and accurate in the sense of being equally yieldable in all directions, that is, with the exception of torsional movements, which it is able to oppose.

The compass instrument illustrated is of novel construction in itself, involving a rotatably adjustable transparent compass dial 31, overlying the transparent cover 7, a vernier scale 32 and a special compass needle carrying the additional forty-five degree angle pointers 33.

The transparent compass card or dial is shown as rotatably set in a confining flange 34 held by an overstanding clip 35 at one edge and as adjustably secured by the vernier plate at the opposite edge, which is loosely keyed at 36 on the flange and held by thumb screw 37.

Knobs 38 are shown on the compass card, by which it may be turned to bring the north and south indications thereon in line with the needle. The parallel lines 39 cross this card, assisting such adjustment. The vernier plate is shown as having a scale of five degree marks off to the left of the index point 40 thereon, to be used in conjunction with and in addition to the ten degree markings on the compass card.

The rotatable compass card can be quickly turned and secured in the angular position of degrees left of north for the direction of travel and thereafter the pilot merely needs to hold the ship with the arrow pointing north on the shifted compass scale. The parallel lines 39 on the compass card aid in this, in that they should be kept parallel with the needle, being easy to read with the instrument set as usual, at a position in front of the pilot. The forty-five degree pointers 33 on the compass needle also are of aid in holding the course since one or more of them may usually be alined with a point on the compass scale from the pilot's position at the controls.

This new compass structure enables closer and more accurate navigation and the universally resilient mounting of the same cushions and maintains this sensitive, easily read compass always in true indicating relation. One particular objection overcome by the invention is the "swinging" action of the needle, occasioned by the compound vibrations existing at times in airplanes, the universal spring mounting absorbing or counteracting these vibrations sufficiently to maintain the needle steady and the instrument accurate and reliable under all such conditions.

What is claimed is:

1. In combination, a compass or like sensitive instrument and a cushion support for the same, comprising a resilient metallic bellows surrounding and enclosing said compass or like instrument, means securing one end of said bellows structure in supporting connection with the compass or like instrument, supporting means connected with the opposite end portion of said metallic bellows structure, said bellows structure being supported at the upper end of the same and the compass or like instrument being supported by the lower end of the bellows structure.

2. In combination, a compass or like sensitive instrument and a cushion support for the same, comprising a resilient metallic bellows surrounding and enclosing said compass or like instrument, means securing one end of said bellows structure in supporting connection with the compass or like instrument, supporting means connected with the opposite end portion of said metallic bellows structure, the bellows structure being supported at the lower end of the same and the compass or like instrument being supported on the upper end of the bellows structure.

3. In combination, a compass or like sensitive instrument and a cushion support for the same, comprising an expansible and contractible resilient bellows structure connected at one end with said instrument, supporting means connected with the opposite end portion of said bellows structure and annular resilient damping material engaging loops of the folds in said bellows structure.

4. In combination, a compass or like sensitive instrument and a cushion support for the same, comprising an expansible and contractible resilient bellows structure connected at one end with said instrument, supporting means connected with the opposite end portion of said bellows structure, annular resilient damping material engaging loops of the folds in said bellows structure and a protective casing surrounding and enclosing both said bellows structure and the annular damping material engaged with the folds of the latter.

5. In combination, a compass or like sensitive instrument and a cushion support for the same, comprising an expansible and contractible resilient bellows structure connected at one end with said instrument, supporting means connected with the opposite end portion of said bellows structure, annular resilient damping material engaging loops of the folds in said bellows structure, a protective casing surrounding and enclosing said bellows structure and damping material and said damping material being in the form of a cushioning layer interposed between the bellows structure and the surrounding casing and held by said casing in engagement with the outer loops of the folds of the bellows structure.

6. In combination, a compass or like sensitive instrument and a cushion support for the same, comprising an expansible and contractible resilient bellows structure connected at one end with said instrument, supporting means connected with the opposite end portion of said bellows structure and annular washer-like resilient damping material seated in an outwardly opening fold in said bellows structure.

7. In combination, a compass or like sensitive instrument and a cushion support for the same, comprising an expansible and contractible resilient bellows structure connected at one end with said instrument, supporting means connected with the opposite end portion of said bellows structure and annular washer-like resilient damping material seated in an inwardly opening fold in said bellows structure.

8. In combination, a compass or like instrument and a mounting therefor comprising an expansible and contractible resilient bellows connected at one end with said instrument, supporting means connected with the opposite end of said bellows, said bellows, instrument and supporting means being combined to form a displacement chamber with the supported instrument and bellows operating as a movable piston for displacement of air and the chamber thus defined having an air relief opening or openings for regulating the damping effect exerted by the displaced air on the bellows and supported instrument.

9. A compass mounting, comprising in combination, a generally cylindrical resilient bellows disposed with the axis of the same substantially vertical and having freely flexing laterally extending folds yieldable in various directions but rigid torsionally, means securing one end of said bellows in supported relation and fixed against rotation, a compass or like sensitive instrument concentrically related to said generally cylindrical bellows and means securing said instrument in supported relation to the opposite end of the bellows and fixed against rotation in respect thereto and whereby said instrument will be resiliently cushioned in various directions while held rigidly fixed on a definite line.

10. A compass mounting, comprising in combination, a generally cylindrical resilient bellows disposed with the axis of the same substantially vertical and having freely flexing laterally extending folds yieldable in various directions but rigid torsionally, means securing one end of said bellows in supported relation and fixed against rotation, a compass or like sensitive instrument concentrically related to said generally cylindrical bellows, means securing said instrument in supported relation to the opposite end of the bellows and fixed against rotation in respect thereto and whereby said instrument will be resiliently cushioned in various directions while held rigidly fixed on a definite line and damping means cooperatively related with said bellows to govern the cushioning movements of the same.

11. A compass mounting, comprising in combination, a generally cylindrical resilient bellows disposed with the axis of the same substantially vertical and having freely flexing laterally extending folds yieldable in various directions but rigid torsionally, means securing one end of said bellows in supported relation and fixed against rotation, a compass or like sensitive instrument concentrically related to said generally cylindrical bellows, means securing said instrument in supported relation to the opposite end of the bellows and fixed against rotation in respect thereto and whereby said instrument will be resiliently cushioned in various directions while held rigidly fixed on a definite line, said supported instrument being located within said generally cylindrical bellows and the supporting means for the bellows including a casing surrounding but spaced from said bellows, said bellows instrument and casing being combined to form a displacement chamber with the supported instrument and bellows operating as a movable piston for displacement of air for damping the vibratory movements.

LUIS DE FLOREZ.